June 25, 1935.  A. T. POTTER  2,006,149
SEAT CONTROL MECHANISM
Filed Dec. 15, 1932  2 Sheets—Sheet 2
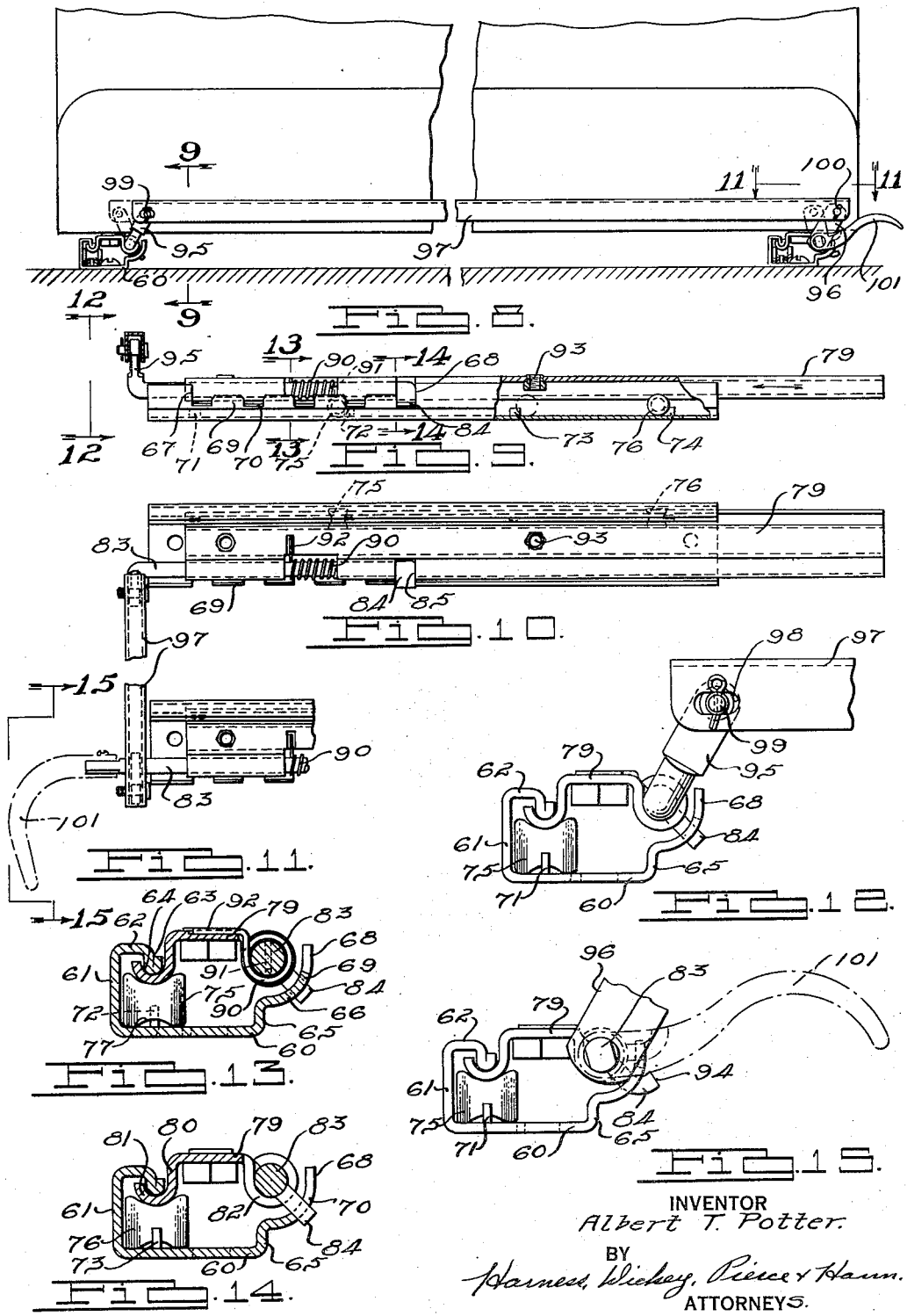
INVENTOR
Albert T. Potter.
BY
Harness, Dickey, Pierce & Hann.
ATTORNEYS.

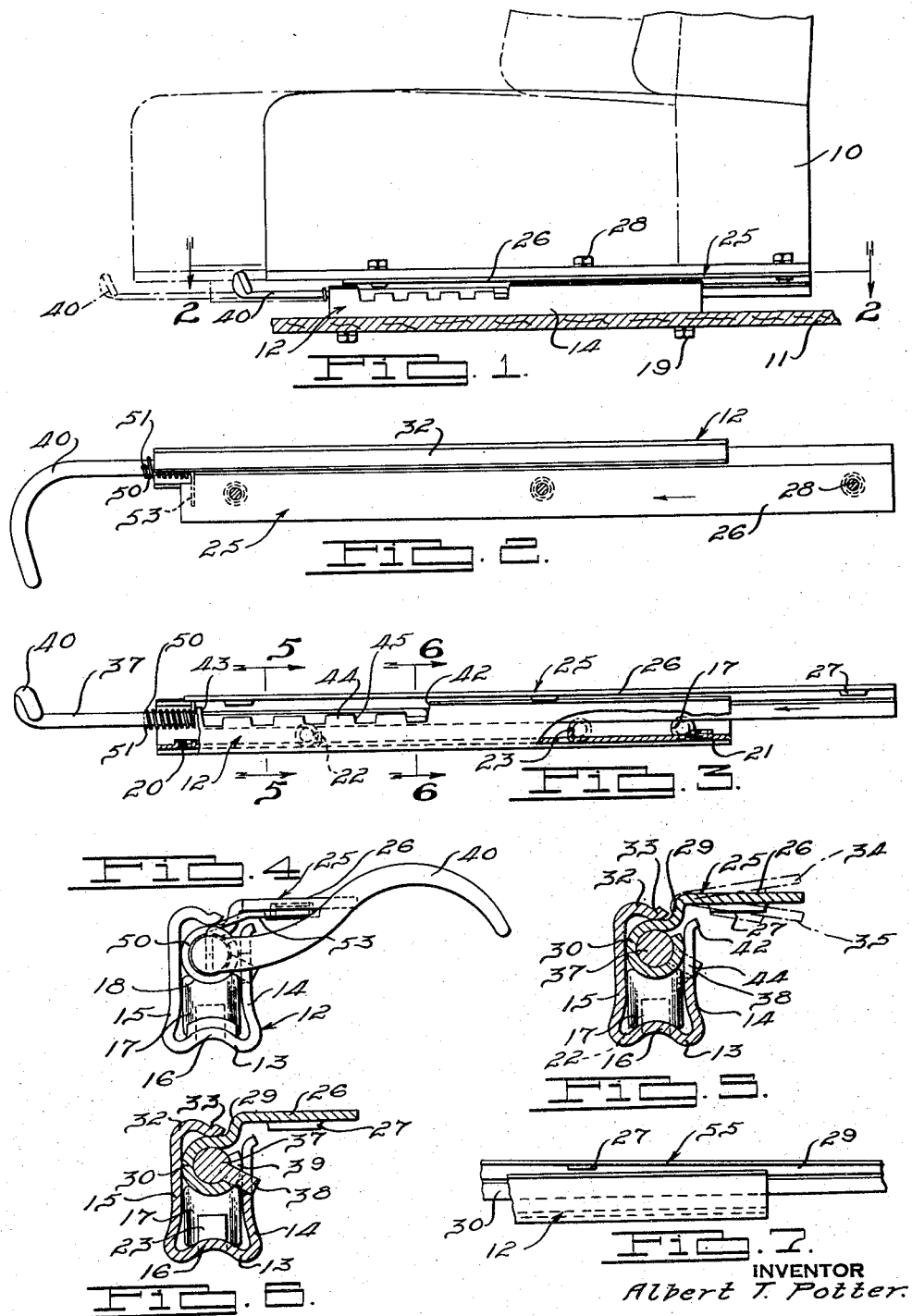

Patented June 25, 1935

2,006,149

UNITED STATES PATENT OFFICE 2,006,149

SEAT CONTROL MECHANISM

Albert T. Potter, Detroit, Mich., assignor to Ainsworth Manufacturing Corporation, a corporation of Michigan Application December 15, 1932, Serial No. 647,317

12 Claims. (Cl. 155—14)

The invention relates to motor vehicles or the like, and it has particular relation to a mechanism for controlling the position of one of the seats therein and particularly the seat provided for the driver of the vehicle.

In certain respects, the invention is related to and constitutes an improvement on my application for patent relating to seat control mechanism Serial No. 638,149, filed October 17, 1932, which matured into Patent No. 1,943,550, issued Jan. 16, 1934.

Similarly to the invention embodied in such copending application for patent, it is one object of the present invention to provide a seat control mechanism in the form of an article of manufacture, which may be installed with little difficulty in motor vehicles produced by motor vehicle manufacturers.

It is also an object of the invention to provide a seat control mechanism of improved character which may be largely manufactured from sheet metal, and thus produced very inexpensively.

Another object of the invention is to provide a seat control mechanism of simple construction, and wherein the parts are arranged in a very efficient and compact relation.

Another object of the invention is to provide a seat control mechanism readily adaptable for mounting on a flat floor surface and an inclined seat.

Another object of the invention is to provide a dual seat control mechanism.

Other objects of the invention will become apparent from the following description relating to a particular embodiment of the invention, and the claims hereinafter set forth.

For a better understanding of the invention, reference may be had to the accompanying drawings, forming a part of the specification wherein:

Figure 1 is a fragmentary, longitudinal, cross-sectional veiw of a motor vehicle body illustrating a seat control mechanism constructed according to one form of the invention;

Figure 2 is a cross sectional view on a slightly larger scale, taken substantially along the line 2—2 of Fig. 1;

Fig. 3 is a side elevational view of the arrangement shown by Fig. 2, with certain parts broken away and shown in cross-section, for the purposes of clarity;

Fig. 4 is an end view on a larger scale, taken from the left end of the construction shown by Fig. 2;

Fig. 5 is a cross-sectional view on a larger scale taken substantially along the line 5—5 of Fig. 3;

Fig. 6 is a cross-sectional view on a larger scale, taken substantially along the line 6—6 of Fig. 3.

Fig. 7 is a side view of a mechanism such as shown by the other figures, in which the seat attaching portion of the upper plate is inclined to accommodate a seat having an inclined bottom surface.

Fig. 8 is a front view of a seat illustrating a seat controlling mechanism conducted according to another form of the invention.

Fig. 9 is a cross-sectional view, with certain parts broken away for clarity, taken substantially along line 9—9 of Fig. 8.

Fig. 10 is a plan view of the construction shown by Fig. 9.

Fig. 11 is a cross-sectional view on a larger scale taken substantially along line 11—11 of Fig. 8, with the seat removed.

Fig. 12 is an end view on a larger scale, taken substantially along line 12—12 of Fig. 9.

Fig. 13 is a cross-sectional view on a larger scale, taken substantially along line 13—13 of Fig. 9.

Fig. 14 is a cross sectional view on a larger scale, taken substantially along line 14—14 of Fig. 9.

Fig. 15 is an end view on a larger scale, taken substantially along line 15—15 of Fig. 11.

Referring to Fig. 1, an adjustable seat is indicated at 10 and the floor of a motor vehicle is indicated at 11. Normally it is desirable that the driver's seat in the motor vehicle be so supported on the floor that it can be adjustably positioned and it is to a seat control mechanism that the invention is particularly related.

Referring to Fig. 4 for example, a lower plate member 12 is provided, and this plate member, as shown, is in the form of a channel, having a base 13, and spaced, vertically directed legs 14 and 15. The base portion 13, has an upwardly convex bearing portion 16 which supports a plurality of rollers 17 having concave grooves 18, the curved surfaces of which are substantially complementary to and engage the convex portion 16 of the base 13.

The member 12 is adapted to be supported on and secured to the floor 11, by means of bolts 19 shown by Fig. 1, which may pass upwardly through the floor and be threaded into upwardly projecting bosses 20 and 21 formed in the convex base portion 16 of the plate member. Between the bosses 20 and 21, the convex portion 16 of the plate member, also has upwardly struck projections 22 and 23 and the boss 20 and projection 22 form limiting stops for one of the rollers 17 disposed therebetween, while the boss 21 and the projection 23 form limiting stops for another of the rollers disposed in this portion of the plate member. Preferably, the legs 14 and 15 of the plate member 12 are disposed closely adjacent to the sides of the rollers so as to constitute lateral guides therefor.

An upper plate member 25 also is provided, and this plate member has a flange portion 26 provided with threaded bosses 27 for receiving bolts 28 that secure the seat 10 to the plate member. The flange portion 26 of the plate member, merges into a downwardly directed portion 29, and the latter terminates in a cylindrically turned portion 30 disposed between the legs 14 and 15 of the lower plate member 12. The outer diameter of the cylindrical portion 30 corresponds to the distance between the legs 14 and 15 and such legs in fact normally are urged by their inherent resiliency into contact with the cylindrical portion so as to obtain oppositely disposed, substantially line and guiding contact therewith. The curvature of the cylindrical portion corresponds to the curvature of the concave groove 18 in the rollers and the cylindrical portion is thus supported by the rollers. The leg 15 of the lower plate member at its upper edge terminates in a portion 32 extending over the channel, and this portion has an arcuate lip 33 which resiliently urges the cylindrical portion 30 into engagement with the rollers. The leg 14 of the lower plate member terminates at its upper edge adjacent to but in normally spaced relation to portion 29 of the upper plate member and the distance between the adjacent edges of the leg 14 and the lip 33 is such as to permit limited pivotal movement of the upper plate member about the axis of the cylindrical portion 30. This movement which is permitted, is illustrated by the broken line positions indicated at 34 and 35 in Figure 5. Normally, the portion 26 of the upper plate member will be disposed horizontally when the seat is secured thereto, but the permission of such oscillatory movement of the upper plate member, enables securing it to the seat without difficulty even though the bottom surface of the seat varies from the horizontal plane or if for any other reason, it is necessary to fulcrum the upper plate member slightly to obtain proper positioning of the parts.

From this description it will be understood that both plate members have rolling contact with the rollers, and that the seat and upper plate member are directly supported on the rollers. It also will be understood that the cylindrical portion of the upper plate member is positively although resiliently maintained in contact with the rollers and that it is guided in its movement thereon, by the substantially line contact engagements between the legs 14 and 15 of the lower plate member and the cylindrical portion 30, and the engagement of the lip 33 with the upper surface of the cylindrical portion. The upper plate member is thus permitted to move longitudinally of the lower plate member, during which the rollers move longitudinally in the lower plate member and have rolling contact with the cylindrical portion 30 of the upper plate member. Owing to this relation of the rollers, they of course will not move the same distance longitudinally of the lower plate member that the seat moves, and ordinarily the movement of the rollers will only be about half the distance the seat moves. The bosses 20 and 21 and the projections 22 and 23, are so spaced that during ordinary movement of the seat between its extreme position, the rollers will move between the stops.

For controlling movement and adjustment of the seat, a rod 37 is rotatably disposed in the cylindrical portion 30 of the upper plate member, as best shown by Fig. 6, and the inner end of the rod has a radial projection 38 which extends through and is circumferentially movable in a slot 39 formed in the wall of the cylindrical portion 30 adjacent its free edge. The width of this slot substantially corresponds to the width of the projection so that a movement of the rod in either direction will move the upper plate member and seat therewith without any appreciable lost motion. The rod 37 is provided with a handle 40 projecting to a position in front of the seat so that the driver by gripping the handle may turn the rod and move the upper plate member and seat longitudinally of the lower plate member and floor.

For maintaining the seat in an adjusted position the leg 14 of the lower plate member is cut out between the shoulders 42 and 43, except for a series of alternating, upwardly directed lips or projections 44 providing alternating slots 45 therebetween. The height of the lips 44 is less than the normal height of the leg 14 which extends to a point near the base 26 of the upper plate. It should now be evident from Fig. 5 for example, that if the rod 37 is turned counter-clockwise, the projection 38 thereon may be moved upwardly to a point above the lips 44 on leg 14 of the lower plate member, and that when the projection is so positioned, the rod and upper plate member may be moved relative to the lower plate member, between the limiting positions defined by the shoulders 42 and 43 on the leg 14. Intermediate these shoulders, the rod may be so moved that its projection 38 may be disposed in vertical alignment with any one of the slots 45 and then upon clockwise movement of the rod, the projections will move downwardly thereinto and thus lock the rod and upper plate member in position. For facilitating entry of the projections into any one of the slots 45, the latter may have upwardly flared sides so that if the projection is not exactly in alignment with the base of the slot, it may be guided downwardly thereinto.

For the purpose of normally urging the rod in a clockwise direction so as to normally urge its projection 38 into one of the slots 45, a helical spring 50 is provided on the forward end of the rod, and has its outer end projecting into an opening 51 in the rod so as to lock this end of the spring thereto. The inner end of the spring terminates in a straight portion 53 which as best shown by Fig. 4, extends between the lip 33 and the upper edge of the leg 14 of the lower plate member, into abutting engagement with the under side of the portion 26 of the upper plate member. For the purpose of accommodating the spring on the rod at the location shown, the cylindrical portion 30 extends only to the inner end of the spring as shown best by Fig. 3. It will be appreciated now that if the rod is turned counter-clockwise to remove the projection 38 from the slot 45 in which it is disposed, the spring will be partially wound and consequently will normally tend to urge the rod in the reverse direction. The spring may be placed in the arrangement initially under tension so that the projection 38 is resiliently retained in the slot.

The operator therefore may adjust the position of the seat merely by gripping the handle 40 and turning the rod counter-clockwise to free the projection 38 from the slot 45 in which it is disposed, and then exert a pull or push on the rod as the case may be, to move the seat. As soon as the seat is moved and the handle 40 is released the projection 38 will naturally move toward engagement with one of the slots 45 and will drop into a slot as soon as it is in substantial alignment therewith.

In assembling the plate members, the upper plate member is assembled with the rod 30 and its spring, and then the cylindrical portion 30 is disposed between the legs 14 and 15 of the lower plate member, it being understood that such legs initially are in a spreaded relation to permit such entry of the cylindrical portion. After the cylindrical portion is disposed between the legs, the latter may be drawn together and into contact with the cylindrical portion and manifestly this drawing of the legs together may be accomplished so as to obtain a constant resilient contact with the cylindrical portion both by the legs and the lip 33 at the upper side of the cylindrical portion.

According to Fig. 7, the upper plate 25 may have its base portion 26 inclined as indicated at 55, so as to permit securing the plate to an inclined seat frame without interfering with the normal operation of the device. This inclination of the base 26 may be effected by a gradual increase in height of the web portion 29 of the upper plate.

The remaining figures particularly relate to a dual seat controlling mechanism comprising devices disposed at opposite sides of the seat respectively, which are interconnected for simultaneous operation. These devices are substantially identical and it should be understood that either mechanism is adaptable for use as a single control mechanism in the event the dual control is not used.

Each device, as best shown by Figures 12 to 15 inclusive, comprises a base plate 60 having a vertical flange 61 at one edge, terminating in a laterally directed portion 62 which in turn terminates in a downwardly and reversely bent bead 63 having a rounded surface 64. At its opposite edge, the plate 60 has a short vertically directed portion 65 which terminates in an arcuate and upwardly extending flange 66. This flange as best shown by Figure 9, is cut out intermediate its ends, thereby providing front and rear shoulders 67 and 68, and intermediate these shoulders, alternating and upwardly projecting lips 69 are provided on the flange, thereby defining a plurality of alternating slots 70 between the shoulders. It will be noted that the height of the lips 69 is less than the height of the flange at opposite ends of the cutout portion defined by the shoulders. It also will be noted that the entry for each slot is slightly flared to facilitate movement of an element into the slot. The base plate 60 at longitudinally spaced points, is provided with upwardly directed projections 71, 72, 73 and 74, and such projections may be formed by upwardly stamping lips from the sheet metal employed. Between the projections 71 and 72, a roller 75 is disposed on the base plate 60 for rolling movement between the projections and a similar roller 76 is mounted on the base plate for rolling movement between the projections 73 and 74. It will be noted that the rollers have grooved faces 77 of concave character.

The device also includes an upper plate 79 having at one edge, a downwardly projecting portion 80 terminating in an arcuate portion 81 adapted to engage the concave face 77 of the rollers in a substantially complementary manner. The upper face of the portion 81 is adapted to substantially fit the curved surface 64 of the bead 63 and in assembling the parts, the bead and flange 62 initially are deflected upwardly out of their normal position, and then after disposing the curved portion 81 on the rollers, the flange 62 and bead 63 are bent downwardly to engage that portion 81 and in such manner that normally the bead resiliently urges the portion 81 against the rollers thereby resiliently maintaining the parts together and preventing loose or vibratory up and down movement of the plate. At its opposite edge, the plate 79 terminates in a cylindrically rolled portion 80 having its axis substantially complementary to the curved flange 66 on the lower plate. This cylindrical portion 82 receives an elongated rod 83 which is rotatable therein, and such rod at its rear end has a radially disposed projecton 84 which projects through a slot 85 in the cylindrical portion, as best shown by Figure 10, so as to allow limited rotary movement of the rod and projection. The projection 84 is adapted to selectively engage the slots 70 formed in the flange 66 of the lower plate member, but it will be appreciated that with the projection disposed vertically above the lips 69, the rod and upper plate member may be moved as a unit longitudinally over the rollers and that the plate may be adjustably positioned and locked in such position by movement of the projection 84 into the desired slot. It will be appreciated that the projections on the lower plate will constitute limits to the rolling movement of the rollers. As previously stated, however, in conjunction with the other figures, each roller will only move or roll along the plate a distance substantially equal to half the distance the upper plate is moved.

For normally urging the rod in a rotary direction to maintain the projection 84 in one of the slots or to urge it into one of the slots, a helical spring 90 is secured at one end to the rod and encircles it, and is disposed in a cut out portion 91 of the cylindrical portion 82 of the upper plate. This spring at its other end extends over the upper surface of the plate 79 as indicated at 92 and may be disposed in a groove in the plate if desired. Accordingly when the rod 83 is turned in a counter-clockwise direction, the spring will be partially wound and will normally tend to urge the rod in a reverse direction and hence the projection 84 into one of the slots.

Each of the plates is provided with suitable means such as threaded bosses 93, for example, so that the seat may be secured to the upper plate and the lower plate secured to the floor of the automobile. It will be noted that the upper plate may pivot in a limited manner between the bead 63 and the rollers, and this is desirable as it permits compensation for variations in position or construction of the seat frame without disturbing the operating mechanism. While the construction described is substantially the same for each of the devices shown in Figure 8, attention is directed to Figure 15 relating to the right hand device, particularly illustrating the projection 84 as having an offset portion 94. The purpose of this is to provide an abutment to engage the seat frame to limit counter-clockwise movement of the rod, and as will presently be described, the rods are interconnected so that the offset projection 85 will, in effect, limit the counter-clockwise movement of both rods. Limiting this counter-clockwise movement of both rods is desirable particularly, to prevent such movement of the projection 84 as to dispose them above the extreme upper edges of the flanges 66 at the shoulders 67 and 68 so that with the mechanism mounted on the seat and floor, it is impossible to so move the rod lengthwise as to dispose the projections past either of the shoulders.

Each of the rods projects beyond the front end of the seat and the rod in the left hand mechanism has an upwardly turned projecting arm 95, having its front and rear sides somewhat flattened and somewhat rounded. The forward end of the rod in the right hand device has an arm 96 secured thereto, and normally the rods 95 and 96 will be substantially parallel. The upper ends of these arms are connected by a channel member 97 into which the upper ends of the arms project at opposite ends of the channel. The left end of the channel, as best shown by Figure 12, has an elongated slot 98 and the channel is secured to the arm 95 by a pin 99 projecting through the slot and through the end of the arm. Any suitable connection such as cotter pins or the like may be utilized in maintaining the pin in position. The right end of the channel similarly is secured to the upper end of the arm 96 by a pin 100, but in the particular construction shown, no elongated slot is necessary. The extreme outer end of the rod in the right hand device has an operating handle 101, secured thereto.

It will therefore be appreciated that by turning the handle 101 counter-clockwise, both rods may be turned simultaneously to move the projections 84 thereon out of the slots 70 in which they are disposed, and then by longitudinally pushing or pulling the rod or seat, the seat may be moved with the upper plate members over the rollers 75 and 76 into the desired adjusted position. If the seat is to be moved only the distance between two slots, as soon as the projections are disengaged from the first slot, and the seat is moved slightly, then the handle may be released and the projections will ride along the upper edge of the next lip 69 until the next slot is reached and then owing to the potential power of the spring, the projections automatically will move downwardly into the next slot.

In the event some misalignment occurs laterally of the seat, so that the projection 84 on the right hand device would be aligned with its slot prior to alignment of the projection 84 in the left hand device with its slot, the elongated opening 98 in the left end of the channel member will permit a return of the channel member and clockwise movement of the right rod by its spring to cause the projection 84 on the latter to move into the adjacent slot. Normally if this occurs, subsequent movement of the automobile or movement of the seat slightly, will cause the projection 84 on the left hand rod to finally become aligned with its slot and to automatically move thereinto, it being understood that the pin 99 will be at the left end of slot 98 before it occurs, owing to the advance turning of the rod in the right hand device. Rounding of the sides of arm 95, reduces frictional contact of the sides of channel 97 with the arm, prevents any sticking or binding of the parts, and renders it easier to operate the devices.

The arrangements provided may be sold as articles of manufactures to be substantially connected to the seat and floor of the motor vehicle by the manufacturer of the latter. It is apparent that the constructions are simple, and compact, and that they will operate to insure positive guiding of the seat with a minimum degree of friction. It is also apparent that the arrangements are of such construction that variations in the floor surface or the underside of the seat may readily be compensated for by the permissibility of pivotal movement of the upper plate member, without interfering with the operative arrangement of the parts. Thus, no bending of metal is required in associating the constructions with the floor and the seat.

Although more than one form of the invention has been illustrated and described in detail, it will be apparent to those skilled in the art that various modifications may be made without departing from the scope of the appended claims.

I claim:

1. An article of manufacture comprising plate members adapted to be connected to seat and supporting elements respectively, roller elements between the members and having rolling contact therewith for movably supporting one member on the other, said rollers having peripheral surface portions curved transversely of the path of relative movement of the members, said plate members having substantially complementary curved portions engaging the curved peripheral portions of the rollers respectively, one of said plate members having a guide disposed longitudinally of the path of relative movement of the members, and means comprising an element extending longitudinally in said guide and cooperating with both plate members for releasably locking them in adjustable positions.

2. In combination, a seat element, a supporting element, members connected to the elements respectively for supporting one on the other, one of said members having a guideway, roller elements in the guideway for supporting one member movably on the other, the other member having a portion projecting over the guideway and having rolling contact with the rollers, and means within the guideway and cooperating with the projecting portion of said other member and the member having the guideway, for relatively locking the members in adjusted positions.

3. In combination, a seat element, a supporting element, members connected to the elements respectively, one of the members having a guideway, rollers in the guideway, the other member projecting into the guideway and having a tubular portion which has rolling contact with the rollers, and oscillatory means in said tubular portion and cooperating with the members for locking the latter in adjusted positions.

4. In combination, an upper seat element, a lower supporting element, members connected to the elements respectively, rollers between the members for movably supporting the seat along a predetermined path of movement, said rollers having peripheral surface portions curved transversely of said path of movement, said upper member having a portion curved complementary to the rollers and contacting therewith and means movably mounting one member on the other for pivotal movement in a plane transverse to said path of movement without substantial interference with the operative contact of the members with the rollers.

5. An article of manufacture comprising plate members adapted to be secured to an automobile seat and floor support respectively, roller elements between and contacting with the plates to support one plate on the other for movement in one direction, and means movably mounting one plate on the other for pivotal movement in a direction transverse to the first direction without substantially interfering with the operative contact of the rollers with the plates.

6. An article of manufacture, comprising plate members adapted to be secured to an automobile seat and floor support respectively, roller elements between and contacting with the plates, and means pivotally mounting one plate on the other without interfering with the operative contact of the rollers with the plates.

7. In combination, a seat, a support, a pair of spaced parallel devices between the seat and support for movably supporting the seat on the support, each device comprising relatively movable elongated plates secured to the seat and support respectively, means mounted on each device and oscillatory about an axis longitudinally of the plates for adjustably locking the members against relative movement, resilient means normally urging each oscillatory means into its locking position, and a transversely extending bar pivotally connecting the oscillatory means so as to simultaneously release them to permit adjustment of the seat.

8. An article of manufacture comprising an elongated plate element formed with a guideway, rollers disposed in the guideway, a second elongated plate element projecting into the guideway and engaging the rollers for supporting one plate on the other for movement longitudinally of the plates, means cooperating with both plates for locking them in adjusted positions, and means pivotally mounting one plate on the other for pivotal movement in a plane transversely to the length thereof, without interfering with the operative contact between the plates and the rollers or the locking means.

9. An article of manufacture comprising a pair of elongated plates having portions for attaching them to a seat and support respectively, bearing means for supporting one plate on the other at one lateral edge, for relative movement longitudinally of the plates, means at the opposite edge of the plate for retaining them in adjusted positions of such movement, and means pivotally mounting one plate on the other for pivotal movement in a plane transversely to the length, without interfering with the operation of the bearing means or action of the adjusting means.

10. In combination, a seat, a support, a pair of spaced parallel devices between the seat and support for movably supporting the seat on the support, each device comprising relatively movable elongated plates secured to the seat and support respectively, means mounted on each device and oscillatory about an axis longitudinally of the plates for adjustably locking the members against relative movement, resilient means normally urging each oscillatory means into its locking position, a transversely extending bar pivotally connecting the oscillatory means so as to simultaneously release them to permit adjustment of the seat, and means enabling one oscillatory means to lock the plates with which it is associated independently of the locking engagement of the other oscillatory means with the other device on which it is mounted.

11. In combination, an automobile seat, a floor support, a pair of spaced devices between the seat and support for movably supporting the seat on the support, each device comprising relatively movable members secured to the seat and support respectively, means for adjustably locking the members of each device against relative movement, resilient means normally urging the locking means on both devices into locking positions, and a bar connected to the locking means of both devices for simultaneously releasing them to permit adjustment of the seat, one of the connections between the bar and locking means comprising a slot and pin to allow one locking means to move to its operative position in the event movement of the other locking means is impeded.

12. An article of manufacture comprising plate members adapted to be secured to an automobile seat and floor support respectively, one of said plate members being of channel shape, rollers within the channel, and having transversely curved upper and lower sides, the other plate member having a curled edge disposed in the channel in substantially complementary engagement with the curved surface of the rollers, and means normally retaining the plates assembled.

ALBERT T. POTTER.